United States Patent
Murata et al.

(10) Patent No.: US 11,270,730 B2
(45) Date of Patent: *Mar. 8, 2022

(54) MAGNETIC DISK SUBSTRATE, METHOD FOR MANUFACTURING SAME AND MAGNETIC DISK

(71) Applicants: UACJ CORPORATION, Tokyo (JP); FURUKAWA ELECTRIC CO., LTD., Tokyo (JP)

(72) Inventors: Takuya Murata, Tokyo (JP); Kotaro Kitawaki, Tokyo (JP); Makoto Yonemitsu, Tokyo (JP); Yasuo Fujii, Tokyo (JP); Ryo Sakamoto, Tokyo (JP); Hideyuki Hatakeyama, Tokyo (JP); Sadayuki Toda, Tokyo (JP)

(73) Assignees: UACJ CORPORATION, Tokyo (JP); FURUKAWA ELECTRIC CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/979,023

(22) PCT Filed: Nov. 28, 2018

(86) PCT No.: PCT/JP2018/043879
§ 371 (c)(1),
(2) Date: Sep. 8, 2020

(87) PCT Pub. No.: WO2019/171675
PCT Pub. Date: Sep. 12, 2019

(65) Prior Publication Data
US 2021/0050034 A1 Feb. 18, 2021

(30) Foreign Application Priority Data
Mar. 9, 2018 (JP) .............................. JP2018-043353

(51) Int. Cl.
*C22F 1/00* (2006.01)
*G11B 5/84* (2006.01)
(Continued)

(52) U.S. Cl.
CPC .......... *G11B 5/8404* (2013.01); *B32B 15/015* (2013.01); *C22C 21/00* (2013.01); *C22F 1/04* (2013.01); *G11B 5/73919* (2019.05)

(58) Field of Classification Search
CPC .................................................. G11B 5/8404
See application file for complete search history.

(56) References Cited

U.S. PATENT DOCUMENTS 5,244,516 A     9/1993  Kawaguchi
10,767,247 B2*  9/2020  Murata ................... C22C 21/00
(Continued)

FOREIGN PATENT DOCUMENTS

JP  02111839 A  4/1990
JP  02205651 A  8/1990
(Continued)

OTHER PUBLICATIONS

Office action issued in JP 2018-043353, dated Aug. 28, 2018 (with machine translation).
ISR issued in Int'l. Application No. PCT/JP2018/043879, dated Feb. 19, 2019.

*Primary Examiner* — Jophy S. Koshy
(74) *Attorney, Agent, or Firm* — Greer, Burns & Crain, Ltd.

(57) ABSTRACT

A magnetic disk substrate is composed of an aluminum alloy substrate, a base plating layer on a surface of the aluminum alloy substrate, and a boundary region between the aluminum alloy substrate and the base plating layer. The boundary region includes a specific boundary region $(D(1)_{I(50-84)})$ having Al emission intensities equal to 50% to 84% of an average Al emission intensity in an interior region of the (Continued)

aluminum alloy substrate in glow discharge optical emission spectroscopy in the depthwise direction from the surface of the magnetic disk substrate. The specific boundary region $(D(1)_{I(50\text{-}84)})$ has a maximum Fe emission intensity $(I(1)_{Fe(max)})$ higher than an average Fe emission intensity $(I(1)_{Fe(ave)})$ in the interior region of the aluminum alloy substrate in the glow discharge optical emission spectroscopy.

9 Claims, 2 Drawing Sheets

(51) Int. Cl.
    *G11B 5/73*     (2006.01)
    *B32B 15/01*     (2006.01)
    *C22C 21/00*     (2006.01)
    *C22F 1/04*     (2006.01)

(56) References Cited

U.S. PATENT DOCUMENTS

2006/0024431 A1   2/2006   Tei et al.
2017/0327930 A1   11/2017   Kitawaki et al.

FOREIGN PATENT DOCUMENTS

| JP | 04143292 A | 5/1992 | |
| JP | 05247659 A | 9/1993 | |
| JP | 2006063438 A | 3/2006 | |
| JP | 6014785 B2 | 10/2016 | |
| JP | 2018005968 A | 1/2018 | |
| WO | 2016068293 A1 | 5/2016 | |
| WO | WO-2018143177 A1 * | 8/2018 | ............. C22C 21/00 |

* cited by examiner

MAGNETIC DISK SUBSTRATE, METHOD FOR MANUFACTURING SAME AND MAGNETIC DISK

This is a National Phase Application filed under 35 U.S.C. § 371, of International Application No. PCT/JP2018/043879, filed Nov. 28, 2018, the contents of which are incorporated by reference.

TECHNICAL FIELD

The present disclosure relates to a magnetic disk substrate, a method of fabricating the magnetic disk substrate, and a magnetic disk.

BACKGROUND ART

Aluminum-alloy magnetic disk substrates applied to storages of devices, such as computers and data centers, are composed of substrates having excellent mechanical characteristics and processability as well as good plating characteristics. For example, a magnetic disk substrate is composed of a substrate based on the 5086 alloy (aluminum alloy containing 3.5 mass % or more and 4.5 mass % or less of Mg, 0.50 mass % or less of Fe, 0.40 mass % or less of Si, 0.20 mass % or more and 0.70 mass % or less of Mn, 0.05 mass % or more and 0.25 mass % or less of Cr, 0.10 mass % or less of Cu, 0.15 mass % or less of Ti, 0.25 mass % or less of Zn, with a balance of Al and unavoidable impurities) defined in JIS H 4000: 2014.

A typical aluminum alloy magnetic disk is fabricated by preparing an annular aluminum alloy plate (disk blank), plating the disk blank to produce a magnetic disk substrate, and then sputtering a magnetic material onto the surface of the plating layer of the magnetic disk substrate.

For example, an aluminum alloy magnetic disk composed of the 5086 alloy is fabricated by the following processes. An aluminum alloy having a desired alloy composition is cast into an ingot. The ingot is homogenized, hot rolled, and then cold rolled to yield a rolled plate having a thickness required as a magnetic disk. The rolled plate may be subject to annealing as required in the middle of the cold rolling, for example. The rolled plate is then punched to produce an annular plate. Such annular plates are staked on each other to remove stress and the like caused in the above process. The stacked annular plates are then subject to pressure annealing (that is, are annealed while being pressurized on the upper and lower surfaces of the plates) to flatten the plates. This process yields an aluminum alloy disk blank having an annular shape.

The surfaces of the resulting disk blank are cut and ground, and then receive pretreatments involving degreasing, etching, desmutting, and zincate treatments (Zn substitution) in sequence. The disk blank then receives a base treatment involving electroless base plating of Ni—P, which is a hard non-magnetic alloy, to produce a magnetic disk substrate. The plated surface of this magnetic disk substrate is polished and smoothed, and then provided with a magnetic material by spattering. This process yields an aluminum alloy magnetic disk.

In recent years, the situation around hard disk drives (HDDs) has been drastically changing. The HDDs have been gradually replaced with solid state drives (SSDs), which are newly introduced storages having a lower weight, a lower power consumption, and a higher speed than the HDDs, in particular, for application to notebook computers. At the same time, development of cloud services has been accompanying rapid expansion of the capacities of data centers year by year. Although the HDDs having lower costs per unit capacity are dominant at present, replacement of the HDDs with the SSDs is expected to be further proceeding in future. The HDDs are therefore required to be improved in capacity, density, and speed to catch up with the SSDs.

The capacity of an HDD can be enhanced by, for example, increasing the number of magnetic disks installable in the HDD, enhancing the capacity of each magnetic disk, and increasing the diameter of the magnetic disks. The most effective procedure among them is increasing the number of installable magnetic disks. In order to increase the number of installable magnetic disks, each magnetic disk, that is, an aluminum alloy substrate for the magnetic disk should have a smaller thickness. Unfortunately, an aluminum alloy substrate for a magnetic disk having such a smaller thickness has a lower rigidity. In addition, in a high-speed HDD, magnetic disks receive increased exciting forces due to large fluid forces generated by rapid rotation of the magnetic disks, and thus cause large disk flutters. That is, the rapidly rotating magnetic disks vibrate (flutter) due to unstable airflows generated between the magnetic disks.

The magnetic disks composed of aluminum alloy substrates having a low rigidity cause large vibration, so that a magnetic head, which is a reading unit, cannot readily follow such vibration of the magnetic disks, thereby increasing the frequency of errors in positioning of the magnetic head. Accordingly, a reduction in thickness of magnetic disks should be accompanied by a reduction in disk flutters, in other words, an improvement in fluttering characteristics. As well as the improvement in fluttering characteristics, a reduction in deficiencies on the surface of the base electroless plating layer is also required, which has been a typical problem. Such deficiencies on the base plating layer lead to deficiencies on the magnetic disk, such as pits. These deficiencies and their surrounding regions cannot be used for reading and wiring of data. That is, as the number of deficiencies increases, the capacity of each magnetic disk decreases.

For example, Patent Literature 1 discloses an aluminum alloy plate for a disk that contains a proper amount of Mg. Patent Literature 2 discloses an aluminum alloy for a magnetic disk substrate that contains a proper amount of Mg. Patent Literature 3 discloses an aluminum alloy substrate for a magnetic disk that contains proper amounts of Si and Fe.

CITATION LIST

Patent Literature

Patent Literature 1: Unexamined Japanese Patent Application Kokai Publication No. H02-111839
Patent Literature 2: Unexamined Japanese Patent Application Kokai Publication No. H02-205651
Patent Literature 3: Japanese Patent No. 6014785

SUMMARY OF INVENTION

Technical Problem

According to Patent Literatures 1 and 2, a reduction in deficiencies on the surface of the base plating layer are achieved by the low Fe and Si contents. Unfortunately, such low Fe and Si contents lead to poor fluttering characteristics in Patent Literatures 1 and 2. According to Patent Literature 3, the aluminum alloy substrate contains Si and thus has a higher rigidity. Unfortunately, the addition of Si in Patent Literature 3 may lead to generation of coarse Si compound particles on the surface of the aluminum alloy substrate, resulting in deficiencies on the base plating layer. These deficiencies may reduce the capacity of a magnetic disk.

An objective of the disclosure is to provide a magnetic disk substrate that can achieve improved fluttering characteristics and effectively reduced deficiencies on the surface of a base electroless plating layer, and provide a method of fabricating the magnetic disk substrate and a magnetic disk.

Solution to Problem

In order to achieve the above objective, the disclosure has main configurations as below:

(1) A magnetic disk substrate includes: an aluminum alloy substrate; a base plating layer on a surface of the aluminum alloy substrate; and a boundary region between the aluminum alloy substrate and the base plating layer. The boundary region has a specific boundary region ($D(1)_{I(50-84)}$) having Al emission intensities equal to 50% to 84% of an average Al emission intensity in an interior region of the aluminum alloy substrate in glow discharge optical emission spectroscopy in the depthwise direction from the surface of the magnetic disk substrate. The specific boundary region ($D(1)_{I(50-84)}$) has a maximum Fe emission intensity ($I(1)_{Fe(max)}$) higher than an average Fe emission intensity ($I(1)_{Fe(ave)}$) in the interior region of the aluminum alloy substrate in the glow discharge optical emission spectroscopy.

(2) In the magnetic disk substrate according to the aspect (1), the base plating layer may be an electroless Ni—P plating layer.

(3) In the magnetic disk substrate according to the aspect (1) or (2), the magnetic disk substrate may be fabricated using an unplated aluminum alloy substrate. The unplated aluminum alloy substrate may include a specific surface region ($D(2)_{I(50-84))}$) having Al emission intensities equal to 50% to 84% of an average Al emission intensity in an interior region of the unplated aluminum alloy substrate in glow discharge optical emission spectroscopy in the depthwise direction from the surface of the unplated aluminum alloy substrate. The specific surface region ($D(2)_{I(50-84)}$) may have a maximum Fe emission intensity ($I(2)_{Fe(max)}$) equal to or higher than 1.1 times of an average Fe emission intensity ($I(2)_{Fe(ave)}$) in the interior region of the unplated aluminum alloy substrate in the glow discharge optical emission spectroscopy.

(4) In the magnetic disk substrate according to any one of the aspects (1) to (3), the aluminum alloy substrate may contain: 0.4 to 3.0 mass % of Fe, 0.1 to 3.0 mass % of Mn, 0.005 to 1.000 mass % of Cu, and 0.005 to 1.000 mass % of Zn; with a balance of Al and unavoidable impurities.

(5) In the magnetic disk substrate according to the aspect (4), the aluminum alloy substrate may further contain at least one element selected from a group comprising 0.1 to 0.4 mass % of Si, 0.1 to 3.0 mass % of Ni, 0.1 to 6.0 mass % of Mg, 0.01 to 1.00 mass % of Cr, and 0.01 to 1.00 mass % of Zr.

(6) In the magnetic disk substrate according to the aspect (4) or (5), the aluminum alloy substrate may further contain at least one element selected from a group comprising Ti, B, and V at a total amount of 0.005 to 0.500 mass %.

(7) A method of fabricating the magnetic disk substrate according to any one of the aspects (1) to (6), includes a process of fabricating an unplated aluminum alloy substrate to be applied to the magnetic disk substrate. The process includes: a punching step of punching an aluminum alloy plate to produce a disk blank having an annular shape; a pressure annealing step of heating the disk blank in a pressurized state to flatten the disk blank; and a grinding step of grinding both surfaces of the flattened disk blank at an amount corresponding to a thickness of 1 μm or more per one surface.

(8) In the method of fabricating the magnetic disk substrate according to the aspect (7), the process of fabricating an unplated aluminum alloy substrate may further include a cutting step of cutting both surfaces of the disk blank before the grinding step.

(9) In the method of fabricating the magnetic disk substrate according to the aspect (7), the process of fabricating an unplated aluminum alloy substrate may further include a preliminarily grinding step of preliminary grinding both surfaces of the disk blank at an amount corresponding to a thickness of 1 μm or more per one surface before the grinding step.

(10) A magnetic disk includes: the magnetic disk substrate according to any one of the aspects (1) to (6); and a magnetic layer disposed on the base plating layer of the magnetic disk substrate directly or holding an interlayer therebetween.

Advantageous Effects of Invention

The disclosure can provide a magnetic disk substrate that can achieve improved fluttering characteristics and effectively reduced deficiencies on the surface of a base electroless plating layer, and provide a method of fabricating the magnetic disk substrate and a magnetic disk

DESCRIPTION OF EMBODIMENTS

Figure 1:
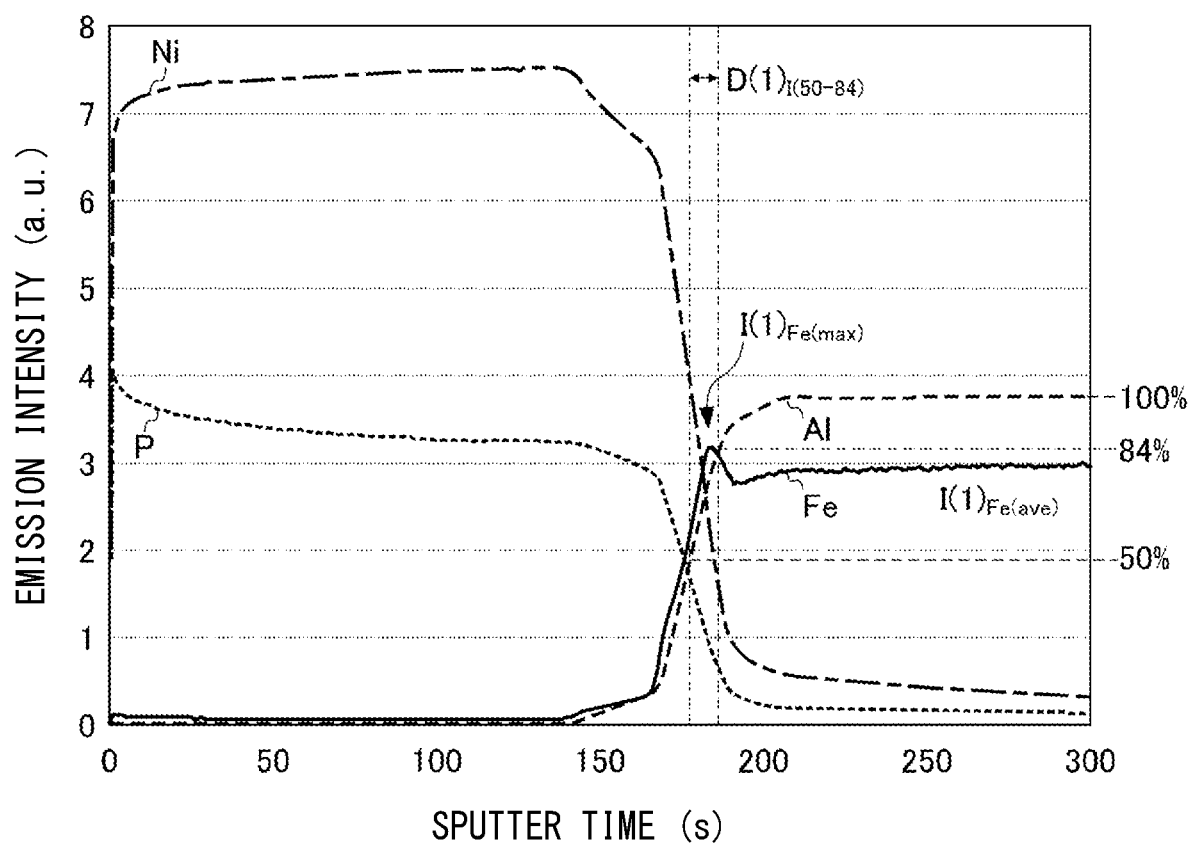
FIG. 1 is a graph illustrating a relationship between emission intensity and sputter time determined by glow discharge optical emission spectroscopy for a magnetic disk substrate according to Example 1 in the depthwise direction from the surface.

An embodiment of the disclosure will now be described in detail.

The present inventors have carried out studies on the relationship between compound particles generated in an aluminum alloy substrate and fluttering characteristics and thus found that a distribution of compound particles in the aluminum alloy substrate can effectively improve the fluttering characteristics. An increase in compound particles in the aluminum alloy substrate, however, leads to an increase in deficiencies on the surface of the base electroless plating layer, as is also obvious from existing knowledge. These two requirements to improve fluttering characteristics and to reduce deficiencies on the surface of the base plating layer are mutually contradictory but must be simultaneously satisfied. The present inventors have carried out further studies and found a solution: such deficiencies on the surface of the base plating layer can be reduced by concentrating and dispersing a certain amount or more of compound particles on the surface of the aluminum alloy substrate and thus suppressing local dissolution of the matrix of the aluminum alloy substrate. Based on existing knowledge, a skilled person is expected to conceive that compound particles on the surface of the aluminum alloy substrate should be decreased to reduce deficiencies on the surface of the base plating layer. That is, the inventors' idea of concentrating and dispersing compound particles on the surface of the aluminum alloy substrate is completely opposite to the existing idea. These new findings have enabled the present inventors to complete the disclosure.

A magnetic disk substrate according to an embodiment of the disclosure is composed of an aluminum alloy substrate, a base plating layer on the surface of the aluminum alloy substrate, and a boundary region between the aluminum alloy substrate and the base plating layer. The boundary region includes a specific boundary region $(D(1)_{I(50\text{-}84)})$ having Al emission intensities equal to 50% to 84% of an average Al emission intensity in an interior region of the aluminum alloy substrate in glow discharge optical emission spectroscopy in the depthwise direction from the surface of the magnetic disk substrate. The specific boundary region $(D(1)_{I(50\text{-}84)})$ has a maximum Fe emission intensity $(I(1)_{Fe(max)})$ higher than an average Fe emission intensity $(I(1)_{Fe(ave)})$ in the interior region of the aluminum alloy substrate in the glow discharge optical emission spectroscopy.

This configuration can achieve improved fluttering characteristics of the aluminum-alloy magnetic disk substrate because an aluminum alloy substrate applied to the magnetic disk substrate contains Fe. The configuration can also reduce deficiencies on the surface of the base electroless plating layer because Al—Fe compound particles are selectively concentrated on the surface of the aluminum alloy substrate. These effects and their detailed mechanisms will now be described.

1. Glow Discharge Optical Emission Spectroscopy

The present inventors focused on the specific boundary region $(D(1)_{I(50\text{-}84)})$ in the magnetic disk substrate and on the base-plating-side surface of an unplated aluminum alloy substrate before being provided with the base plating layer. The present inventors thus conducted glow discharge optical emission spectroscopy for the magnetic disk substrate and the unplated aluminum alloy substrate. The following explanation will focus on the glow discharge optical emission spectroscopy for the magnetic disk substrate and the unplated aluminum alloy substrate. The unplated aluminum alloy substrate indicates an aluminum alloy substrate before receiving surface treatments, such as base plating, and is applied to a magnetic disk substrate. The base-plating-side surface of the unplated aluminum alloy substrate indicates the surface provided with the base plating layer by electroless plating.

First, the glow discharge optical emission spectroscopy for the magnetic disk substrate will now be explained. This spectroscopy is conducted in the depthwise direction from the surface of the magnetic disk substrate, while focusing on the maximum Fe emission intensity $(I(1)_{Fe(max)})$ in the specific boundary region $(D(1)_{I(50\text{-}84)})$. The maximum Fe emission intensity $(I(1)_{Fe(max)})$ in the specific boundary region $(D(1)_{I(50\text{-}84)})$ is compared with the average Fe emission intensity $(I(1)_{Fe(ave)})$ in the interior region of the aluminum alloy substrate constituting the magnetic disk substrate, to determine the behavior of the Fe density in a boundary region of the magnetic disk substrate. The boundary region indicates a region formed between the base plating layer and the surface of the aluminum alloy substrate in the depthwise direction from the surface of the magnetic disk substrate. The specific boundary region $(D(1)_{I(50\text{-}84)})$ indicates a portion of the boundary region having Al emission intensities equal to 50% to 84% of the average Al emission intensity in the interior region of the aluminum alloy substrate constituting the magnetic disk substrate in the depthwise direction from the surface of the magnetic disk substrate.

With reference to JIS K 0146: 2002 (Surface chemical analysis—Sputter depth profiling—Optimization using layered systems as reference materials), the specific boundary region $(D(1)_{I(50\text{-}84)})$ in the boundary region is defined to have Al emission intensities equal to 50% to 84% of the average Al emission intensity in the interior region of the aluminum alloy substrate. JIS K 0146: 2002 states that "the interface is at a position where the signal intensity of a certain element reaches 50% of the signal intensity in the adjoining film on the substrate". Based on this statement, the position having an Al emission intensity equal to 50% of the average emission intensity is assumed to be the center of the boundary region formed between the base plating layer and the aluminum alloy substrate in the depthwise direction from the surface of the magnetic disk substrate. JIS K 0146: 2002 also states that a depth resolution is "a sputter time in which the signal intensity varies from 16% to 84% (or from 84% to 16%) relative to the 100% signal intensity in a film or substrate for a monolayer structure or in each of adjoining layers for a multi-layer structure". Based on this statement, the position having an Al emission intensity equal to 84% of the average emission intensity is assumed to be the outermost surface of the aluminum alloy substrate in the depthwise direction from the surface of the magnetic disk substrate.

Furthermore, the interior region of the aluminum alloy substrate constituting the magnetic disk substrate indicates a region in which a sputter time for the magnetic disk substrate is 250 seconds or more in the glow discharge optical emission spectroscopy. This region is located at a depth of 5 μm or more from the outermost surface of the aluminum alloy substrate and is considered to be appropriate for determining the alloy composition of the aluminum alloy substrate.

Second, the glow discharge optical emission spectroscopy for the unplated aluminum alloy substrate will now be explained. This spectroscopy is conducted in the depthwise direction from the base-plating-side surface of the unplated aluminum alloy substrate, while focusing on the maximum Fe emission intensity $(I(2)_{Fe(max)})$ in a specific surface region $(D(2)_{I(50\text{-}84)})$. The maximum Fe emission intensity $(I(2)_{Fe(max)})$ in the specific surface region $(D(2)_{I(50\text{-}84)})$ is compared with the average Fe emission intensity $(I(2)_{Fe(ave)})$ in the interior region of the unplated aluminum alloy substrate, to determine the behavior of the Fe density on the surface of the unplated aluminum alloy substrate. The specific surface region $(D(2)_{I(50\text{-}84)})$ indicates a region having Al emission intensities equal to 50% to 84% of the average Al emission intensity in the interior region of the unplated aluminum alloy substrate in the depthwise direction from the surface of the unplated aluminum alloy substrate.

The base-plating-side surface of the unplated aluminum alloy substrate has a naturally oxidized film. Accordingly, the specific surface region $(D(2)_{I(50\text{-}84)})$ is defined to have Al emission intensities equal to 50% to 84% of the average Al emission intensity in the interior region of the unplated aluminum alloy substrate, in accordance with JIS K 0146: 2002.

The interior region of the unplated aluminum alloy substrate indicates a region in which a sputter time for the unplated aluminum alloy substrate is 15 seconds or more in the glow discharge optical emission spectroscopy. This region provides stable emission intensities of the elements contained in the unplated aluminum alloy substrate, and no material other than the naturally oxidized film exists on the surface of the unplated aluminum alloy substrate. This region is therefore considered to be appropriate for analyzing the alloy composition of the unplated aluminum alloy substrate.

2. Relationship Between Electroless Plating and Fe Emission Intensity

The following description will focus on the relationship between electroless plating and Fe emission intensity in glow discharge optical emission spectroscopy.

In general, an aluminum alloy substrate to be provided with electroless Ni—P plating has a zincate coating on its surface formed by zincate treatments. In the initial stage of electroless Ni—P plating, Ni—P is deposited on the outermost surface of the zincate coating formed by zincate treatments on the surface of the aluminum alloy substrate. While the zincate coating is exposed, deposition of Ni—P is advanced by dissolution of Zn from the zincate coating. This deposition proceeds at an extremely high speed, so that the zincate coating is covered with Ni—P in a short period. The zincate coating after being covered with Ni—P has nothing to do with the deposition. After covering of the zincate coating, the deposition of Ni—P continues on the Ni—P layer that covers the zincate coating.

As explained above, the magnetic disk substrate has the zincate coating remaining between the electroless Ni—P plating layer (base plating layer) and the aluminum alloy substrate, that is, on the surface of the aluminum alloy substrate adjacent to the electroless Ni—P plating layer. In more strict terms, the base plating layer is formed on the surface of the aluminum alloy substrate via the zincate coating. The zincate coating has a thickness within the range of 5 to 100 nm, for example.

The glow discharge optical emission spectroscopy is conducted in the depthwise direction of the magnetic disk substrate from the surface of the base plating layer (the surface of the magnetic disk substrate) to the interior region of the aluminum alloy substrate, to determine a distribution of Fe in the magnetic disk substrate by means of Fe emission intensity. The Fe emission intensity in the glow discharge optical emission spectroscopy for the magnetic disk substrate corresponds to both of the Fe deposited by the zincate treatments on the surface of the aluminum alloy substrate and the Al—Fe compound particles in the aluminum alloy substrate.

In an aluminum alloy substrate having the below-described alloy composition, most of the Al—Fe compound particles exist in the form of Al—Fe—Mn compound particles. The Al—Fe—Mn compound particles have a small potential difference from the matrix of the aluminum alloy substrate. This feature leads to a low level of local cell corrosion, so that local dissolution of the matrix does not readily occur on the surface of the aluminum alloy substrate.

At a low density of Al—Fe—Mn compound particles, however, the matrix has a larger area relative to the Al—Fe—Mn compound particles on the surface of the aluminum alloy substrate. The matrix is thus locally dissolved around the Al—Fe—Mn compound particles on the surface of the aluminum alloy substrate regardless of a low level of local cell corrosion. Such nonuniform reactions make a zincate coating formed by zincate treatments nonuniform. This nonuniform zincate coating causes portions of the matrix of the aluminum alloy substrate to be exposed and locally dissolved to generate gas in the subsequent electroless plating. The gas is released through holes formed in the base plating layer, which become surface deficiencies.

In contrast, at a high density of Al—Fe—Mn compound particles, the matrix has a smaller area relative to the Al—Fe—Mn compound particles on the surface of the aluminum alloy substrate. This configuration suppresses local dissolution of the matrix around the Al—Fe—Mn compound particles on the surface of the aluminum alloy substrate. That is, the reactions uniformly occur on the entire surface of the aluminum alloy substrate and contribute to formation of a uniform zincate coating. The matrix of the aluminum alloy substrate is thus not exposed and not locally dissolved in the electroless plating, thereby reducing deficiencies on the surface of the base plating layer.

If the glow discharge optical emission spectroscopy for the aluminum alloy substrate provided with electroless plating (that is, for the magnetic disk substrate) demonstrates that the maximum Fe emission intensity $(I(1)_{Fe(max)})$ in the specific boundary region $(D(1)_{I(50-84)})$ is higher than the average Fe emission intensity $(I(1)_{Fe(ave)})$ in the interior region of the aluminum alloy substrate, the density of Al—Fe compound particles in the specific boundary region $(D(1)_{I(50-84)})$ is higher than that in the interior region of the aluminum alloy substrate. The Fe emission intensities in this condition means that the zincate coating on the surface of the aluminum alloy substrate has a sufficient thickness and properly covers the matrix of the aluminum alloy substrate, thereby reducing deficiencies on the surface of the base plating layer. In order to sufficiently reduce deficiencies on the base plating layer, the maximum Fe emission intensity $(I(1)_{(Fe(max))})$ in the specific boundary region $(D(1)_{I(50-84)})$ should preferably be equal to or higher than 1.01 times of the average Fe emission intensity $(I(1)_{Fe(ave)})$.

The glow discharge optical emission spectroscopy can also be conducted for the unplated aluminum alloy substrate to determine the density of Al—Fe compound particles. A dense distribution of Al—Fe compound particles on the surface of the aluminum alloy substrate can effectively reduce deficiencies on the base plating layer, as explained above. Unfortunately, some of the Al—Fe compound particles on the surface of the aluminum alloy substrate are removed in the etching step before the zincate treatment step. The Al—Fe compound particles are thus required to have a high density on the surface of the unplated aluminum alloy substrate before the etching step so as to sufficiently remain on the surface of the aluminum alloy substrate until the zincate treatment step.

Accordingly, the process of fabricating an unplated aluminum alloy substrate involves grinding of an aluminum alloy disk blank, as explained below. In the grinding step, the upper and lower surfaces of the disk blank are ground while being pressurized with grindstones. This pressure grinding of the surfaces of the disk blank causes some of the Al—Fe compound particles to be removed together with the surrounding matrix of the disk blank and causes the rest of the Al—Fe compound particles to remain in an embedded state in the matrix on the surface of the disk blank, because the Al—Fe compound particles have a higher hardness than the matrix. The matrix of the disk blank, which has a lower hardness than the Al—Fe compound particles, is more readily removed by grinding than the Al—Fe compound particles and thus causes Al—Fe compound particles disposed directly under the removed matrix to be exposed on the disk blank at a high probability.

That is, the embedding of Al—Fe compound particles and the exposure of other Al—Fe compound particles in the grinding step can increase the density of Al—Fe compound particles on the surface of the unplated aluminum alloy substrate. The layer formed on the unplated aluminum alloy substrate in this grinding step is defined as an Fe concentrated layer. The Fe concentrated layer is formed in the specific surface region $(D(2)_{I(50-84)})$ and includes concentrated Al—Fe compound particles. The Fe concentrated layer has a density of Al—Fe compound particles higher than the average density of Al—Fe compound particles in the interior region of the unplated aluminum alloy substrate. In other words, the Fe concentrated layer has a maximum Fe emission intensity higher than the average Fe emission intensity in the interior region of the unplated aluminum alloy substrate.

If the glow discharge optical emission spectroscopy for the unplated aluminum alloy substrate demonstrates that the maximum Fe emission intensity $(I(2)_{Fe(max)})$ in the specific surface region $(D(2)_{I(50-84)})$ is equal to or higher than 1.1 times of the average Fe emission intensity $(I(2)_{Fe(ave)})$ in the interior region of the unplated aluminum alloy substrate, the surface of the unplated aluminum alloy substrate has a sufficient density of Al—Fe compound particles that contribute to reactions in the etching step. This configuration enables a sufficient amount of Al—Fe compound particles to remain on the surface of the aluminum alloy substrate until the zincate treatment step, even after removal of some of the Al—Fe compound particles in the etching step.

3. Alloy Composition of an Aluminum Alloy Substrate

The following description will focus on the alloy composition of an aluminum alloy substrate that constitutes an aluminum-alloy magnetic disk substrate. The aluminum alloy substrate should preferably contain essential elements including 0.4 to 3.0 mass % (hereinafter abbreviated simply as "%") of Fe, 0.1% to 3.0% of Mn, 0.005% to 1.000% of Cu, and 0.005% to 1.000% of Zn, with a balance of Al and unavoidable impurities. The aluminum alloy substrate may further contain at least one first optional element selected from a group comprising 0.1% to 0.4% of Si, 0.1% to 3.0% of Ni, 0.1% to 6.0% of Mg, 0.01% to 1.00% of Cr, and 0.01% to 1.00% of Zr. In addition, the aluminum alloy substrate may further contain at least one second optional element selected from a group comprising Ti, B, and V at a total content within the range of 0.005% to 0.500%.

Each of the elements will now be described.

(Fe: 0.4% to 3.0%)

Fe exists mainly in the form of second phase particles (for example, Al—Fe compound particles) and partly in the form of a solid solution in the matrix of the aluminum alloy. Fe has effects of improving the strengths and fluttering characteristics of a magnetic disk substrate. When the magnetic disk substrate receives vibration, the energy of this vibration is rapidly absorbed by a viscous flow at the interface between the second phase particles and the matrix. This feature can achieve excellent fluttering characteristics. An Fe content of less than 0.4% cannot achieve sufficient strengths and fluttering characteristics of the magnetic disk substrate. In contrast, an Fe content exceeding 3.0% causes generation of a number of coarse Al—Fe compound particles. These coarse Al—Fe compound particles may fall off from the aluminum alloy substrate to yield a number of large pits on the surface of the aluminum alloy substrate, thereby impairing the surface smoothness of the base plating layer and causing peeling of the base plating layer. For these reasons, the Fe content should preferably be within the range of 0.4% to 3.0% and more preferably within the range of 0.8% to 1.8%.

(Mn: 0.1% to 3.0%)

Mn exists mainly in the form of second phase particles (for example, Al—Mn compound particles). Mn has effects of improving the strengths and fluttering characteristics of a magnetic disk substrate. When the magnetic disk substrate receives vibration, the energy of this vibration is rapidly absorbed by a viscous flow at the interface between the second phase particles and the matrix. This feature can achieve excellent fluttering characteristics. Mn is bound to Al—Fe compound and forms Al—Fe—Mn compound. The Al—Fe—Mn compound has a small potential difference from the matrix of the aluminum alloy and suppresses local cell corrosion, thereby contributing to uniform reactions on the surface of the aluminum alloy substrate. An Mn content of less than 0.1% cannot achieve sufficient strengths and fluttering characteristics of the magnetic disk substrate. In contrast, an Mn content exceeding 3.0% causes generation of a number of coarse Al—Mn compound particles. These coarse Al—Mn compound particles may fall off to yield a number of large pits, thereby impairing the surface smoothness of the base plating layer and causing peeling of the base plating layer. For these reasons, the Mn content should preferably be within the range of 0.1% to 3.0% and more preferably within the range of 0.1% to 1.0%.

(Cu: 0.005% to 1.000%)

Cu exists mainly in the form of second phase particles (for example, Al—Cu compound particles). Cu has effects of improving the strengths and fluttering characteristics of a magnetic disk substrate. Cu also has effects of applying a zincate coating in a thin, uniform, and dense manner to improve the smoothness of the base plating layer. A Cu content of less than 0.005% cannot achieve sufficient strengths and fluttering characteristics of the magnetic disk substrate. This Cu content also leads to a nonuniform zincate coating, thereby impairing the smoothness of the base plating layer. In contrast, a Cu content exceeding 1.000% causes generation of a number of coarse Al—Cu compound particles. These coarse Al—Cu compound particles may fall off to yield a number of large pits, thereby impairing the surface smoothness of the base plating layer and causing peeling of the base plating layer. For these reasons, the Cu content should preferably be within the range of 0.005% to 1.000% and more preferably within the range of 0.005% to 0.400%.

(Zn: 0.005% to 1.000%)

Zn has effects of applying a zincate coating in a thin, uniform, and dense manner to improve the smoothness and adhesion of the base plating layer. Zn forms second phase particles with other elements and thus improves the fluttering characteristics of the magnetic disk substrate. A Zn content of less than 0.005% leads to a nonuniform zincate coating, thereby impairing the smoothness of the base plating layer. In contrast, a Zn content exceeding 1.000% makes the electric potential of the matrix of the aluminum alloy far less noble, so that local cell corrosion occurs between the matrix and the compound at a considerable level, resulting in a high rate of dissolution of the matrix. This phenomenon increases the unevenness of the surface of the aluminum alloy substrate and thus impairs the surface smoothness of the base plating layer. For these reasons, the Zn content should preferably be within the range of 0.005% to 1.000% and more preferably within the range of 0.100% to 0.700%.

(Si: 0.1% to 0.4%)

Si exists mainly in the form of second phase particles (for example, Si particles). Si has effects of improving the strengths and fluttering characteristics of a magnetic disk substrate. When the magnetic disk substrate receives vibration, the energy of this vibration is rapidly absorbed by a viscous flow at the interface between the second phase particles and the matrix. This feature can achieve excellent fluttering characteristics. An Si content of less than 0.1% cannot achieve sufficient strengths and fluttering characteristics of the magnetic disk substrate. In contrast, an Si content exceeding 0.4% causes generation of a number of coarse Si particles. These coarse Si particles may fall off to yield a number of large pits, thereby impairing the surface smoothness of the base plating layer and causing peeling of the base plating layer. For these reasons, the Si content should preferably be within the range of 0.1% to 0.4% and more preferably within the range of 0.1% to 0.3%.

(Ni: 0.1% to 3.0%)

Ni exists mainly in the form of second phase particles (for example, Al—Ni compound particles). Ni has effects of improving the strengths and fluttering characteristics of a magnetic disk substrate. When the magnetic disk substrate receives vibration, the energy of this vibration is rapidly absorbed by a viscous flow at the interface between the second phase particles and the matrix. This feature can achieve excellent fluttering characteristics. An Ni content of less than 0.1% cannot achieve sufficient strengths and fluttering characteristics of the magnetic disk substrate. In contrast, an Ni content exceeding 3.0% causes generation of a number of coarse Al—Ni compound particles. These coarse Al—Ni compound particles may fall off to yield a number of large pits, thereby impairing the surface smoothness of the base plating layer and causing peeling of the base plating layer. For these reasons, the Ni content should preferably be within the range of 0.1% to 3.0% and more preferably within the range of 0.1% to 1.0%.

(Mg: 0.1% to 6.0%)

Mg exists mainly in the form of second phase particles (for example, Mg—Si compound particles). Mg has effects of improving the strengths and fluttering characteristics of a magnetic disk substrate. An Mg content of less than 0.1% cannot achieve sufficient strengths and fluttering characteristics of the magnetic disk substrate. In contrast, an Mg content exceeding 6.0% inhibits rolling of the aluminum alloy. For these reasons, the Mg content should preferably be within the range of 0.1% to 6.0% and more preferably within the range of 0.3% to 1.0%.

(Cr: 0.01% to 1.00%)

Cr exists mainly in the form of second phase particles (for example, Al—Cr compound particles). Cr has effects of improving the strengths and fluttering characteristics of a magnetic disk substrate. A Cr content of less than 0.01% cannot achieve sufficient strengths and fluttering characteristics of the magnetic disk substrate. In contrast, a Cr content exceeding 1.00% causes generation of a number of coarse Al—Cr compound particles. These coarse Al—Cr compound particles may fall off to yield a number of large pits, thereby impairing the surface smoothness of the base plating layer and causing peeling of the base plating layer. For these reasons, the Cr content should preferably be within the range of 0.01% to 1.00% and more preferably within the range of 0.10% to 0.50%.

(Zr: 0.01% to 1.00%)

Zr exists mainly in the form of second phase particles (for example, Al—Zr compound particles). Zr has effects of improving the strengths and fluttering characteristics of a magnetic disk substrate. A Zr content of less than 0.01% cannot achieve sufficient strengths and fluttering characteristics of the magnetic disk substrate. In contrast, a Zr content exceeding 1.00% causes generation of a number of coarse Al—Zr compound particles. These coarse Al—Zr compound particles may fall off to yield a number of large pits, thereby impairing the surface smoothness of the base plating layer and causing peeling of the base plating layer. For these reasons, the Zr content should preferably be within the range of 0.01% to 1.00% and more preferably within the range of 0.10% to 0.50%.

(Ti+B+V: 0.005% to 0.500%)

Ti, B, and V form second phase particles (for example, particles of boride, such as $TiB_2$, or $Al_3Ti$ or Ti—V—B) during a solidification process of casting, which serve as nuclei of crystal grains and can thus produce finer crystal grains. These finer crystal grains increase the size uniformity of the aluminum alloy structures, thereby reducing the variations in the strengths and fluttering characteristics of a magnetic disk substrate. These effects cannot be achieved at a total content of Ti, B, and V of less than 0.005%. In contrast, the effects are saturated and not significantly enhanced at a total content of Ti, B, and V exceeding 0.500%. For these reasons, the total content of Ti, B, and V should preferably be within the range of 0.005% to 0.500% and more preferably within the range of 0.005% to 0.100%. It should be noted that the total content of Ti, B, and V indicates the sum of the amounts of three elements for the alloy containing all the three elements, the sum of the amounts of two elements for the alloy containing the two elements, and the amount of one element for the alloy containing the one element.

(Other Elements)

The rest of the aluminum alloy substrate is composed of Al and unavoidable impurities. Examples of the unavoidable impurities include Pb, Ga, and Sn. If the content of each element of the unavoidable impurities is less than 0.1% and if the total content of the unavoidable impurities is less than 0.2%, the magnetic disk substrate has desired advantages. The Al content is calculated by subtracting the contents of the above-described elements and the contents of the unavoidable impurities from the amount of the entire aluminum alloy substrate.

4. Method of Fabricating a Magnetic Disk Substrate

A method of fabricating a magnetic disk substrate involves: a process of fabricating an unplated aluminum alloy substrate to be applied to a magnetic disk substrate (S10); a process of fabricating an aluminum alloy substrate for a magnetic disk by providing the unplated aluminum alloy substrate with a plating pretreatment (S20); and a process of providing the aluminum alloy substrate for a magnetic disk with electroless plating and thus forming a base plating layer (S30). The process of fabricating an unplated aluminum alloy substrate (S10) involves a casting step (S11), a homogenizing step (S12), a hot rolling step (S13), a cold rolling step (S14), a punching step (S15), a pressure annealing and flattening step (S16), a grinding step (S17), and a stress-relieving heat treatment step (S18). The process (S10) should preferably include either one of a cutting step (S19A) and a preliminary grinding step (S19B) between the pressure annealing and flattening step (S16) and the grinding step (S17), as explained below. The process of fabricating an aluminum alloy substrate for a magnetic disk (S20) involves an alkaline degreasing step (S21), an acid etching step (S22), a desmutting step (S23), and a zincate treatment step (S24). Each of the steps will now be explained in detail.

(Casting Step (S11))

In the casting step (S11), a molten metal adjusted to have a certain alloy composition is casted into an ingot. Specifically, certain amounts of materials are heated and melted by a known method to prepare a molten aluminum alloy having a certain alloy composition. The resulting molten aluminum alloy is casted by a known method, such as a semi-continuous casting (DC casting) method or a continuous casting (CC) method. The cooling rate in the casting should preferably be within the range of 0.1° C. to 1,000° C. per second.

In the case of the DC casting method, a molten metal is casted through a spout and is cooled by a bottom block, the wall of a water-cooled mold, and cooling water directly ejected to the circumference of an ingot. The metal is solidified and then extracted downward in the form of an ingot. In the case of the CC method, a molten metal is supplied between a pair of rollers (alternatively, belt casters or block casters) through a casting nozzle, and is cooled by the rollers, to directly cast a thin plate.

In the DC casting method, the casting step (S11) is followed by the homogenizing step (S12), the hot rolling step (S13), and then the cold rolling step (S14). In contrast, in the CC method, the casting step (S11) is followed by the cold rolling step (S14). That is, the process of the CC method excludes the homogenizing step (S12) and the hot rolling step (S13).

(Homogenizing Step (S12))

In the homogenizing step (S12) subsequent to the casting step (S11), the aluminum alloy ingot produced in the casting step (S11) is homogenized. The homogenizing step (S12) is not essential but optional. Although the conditions of homogenization are not particularly limited, the aluminum alloy ingot after casting is subject to a one-step heat treatment, for example, at 500° C. or more for 0.5 hours or more. The upper limit of the heating temperature in homogenization is not particularly limited but defined to be 650° C. because a heating temperature exceeding 650° C. may cause melting of the aluminum alloy.

(Hot Rolling Step (S13))

In the hot rolling step (S13) subsequent to the homogenizing step (S12), the aluminum alloy ingot homogenized in the homogenizing step (S12) is hot rolled to produce a hot rolled plate. The hot rolling step (S13) is not essential but optional. In the hot rolling step (S13) of the process including the homogenizing step (S12), the initial temperature of the hot rolling should preferably be within the range of 300° C. to 550° C. and the final temperature of the hot rolling should preferably be less than 380° C. and more preferably 300° C. or less. The lower limit of the final temperature of the hot rolling is not particularly limited but defined to be 100° C. in order to suppress troubles, such as edge cracking. In contrast, in the hot rolling step (S13) of the process excluding the homogenizing step (S12), the initial temperature of the hot rolling should preferably be less than 380° C. and more preferably less than 350° C. The lower limit of the final temperature of the hot rolling is not particularly limited but defined to be 100° C. in order to suppress troubles, such as edge cracking.

(Cold Rolling Step (S14))

In the cold rolling step (S14) subsequent to the hot rolling step (S13), the plate hot rolled in the hot rolling step (S13) is cold rolled to produce an aluminum alloy plate (cold rolled plate) having a desired thickness. The thickness of the aluminum alloy plate is, for example, approximately 0.45 to 1.8 mm. The conditions of cold rolling are not particularly limited but can be appropriately determined depending on the strengths and thickness of the magnetic disk substrate. The reduction ratio should preferable be within the range of 10% to 95%.

It should be noted that an annealing step may be added before or during the cold rolling in order to ensure the processability of the cold rolling. Exemplary preferable conditions of annealing include a temperature of 200° C. or more and less than 380° C. and a period of 0.1 to 10 hours in the case of batch annealing.

(Punching Step (S15))

In the punching step (S15) subsequent to the cold rolling step (S14), the aluminum alloy plate prepared in the cold rolling step (S14) is punched to produce a disk blank having an annular shape.

(Pressure Annealing and Flattening Step (S16))

In the pressure annealing and flattening step (S16) subsequent to the punching step (S15), the disk blank prepared in the punching step (S15) is heated in a pressurized state. This pressure annealing flattens the surfaces of the disk blank. The surfaces of the disk blank indicate the upper and lower surfaces of the disk blank. Exemplary conditions of pressure annealing and flattening to the disk blank include a temperature within the range of 220° C. to 450° C. and a period of 30 minutes or more.

(Cutting Step (S19A))

The process may involve the cutting step (S19A) after the pressure annealing and flattening step (S16) and before the below-explained grinding step (S17). In the cutting step (S19A), the surfaces of the disk blank are cut at the amount corresponding to a thickness of 5 μm or more per one surface. The cutting step (S19A) is not essential but optional. The conditions of cutting are not particularly defined.

(Preliminary Grinding Step (S19B))

The process may involve the preliminary grinding step (S19B) after the pressure annealing and flattening step (S16) and before the grinding step (S17). In the preliminary grinding step (S19B), the surfaces of the disk blank are preliminarily ground at the amount corresponding to a thickness of 1 μm or more per one surface under an applied pressure of 10 to 500 g/cm$^2$. The preliminary grinding is coarser than the grinding in the grinding step (S17). The preliminary grinding uses grindstones having a grit size coarser than #4000, for example. The preliminary grinding step (S19B) is not essential but optional.

Either one of the cutting step (S19A) and the preliminary grinding step (S19B) should preferably be conducted in order to increase the Fe density.

(Grinding Step (S17))

In the grinding step (S17) subsequent to the pressure annealing and flattening step (S16), the surfaces of the disk blank are ground. Specifically, the upper and lower surfaces of the disk blank are ground while being held and pressurized between grindstones. In the process including the cutting step (S19A) or the preliminary grinding step (S19B), the surfaces of the disk blank that were cut or preliminarily ground are ground.

The grinding uses grindstones having a grit size of approximately #4000, for example. The pressure applied to the disk blank is within the range of 10 to 500 g/cm$^2$ and should preferably be within the range of 30 to 300 g/cm$^2$. At a grinding pressure applied to the disk blank of less than 10 g/cm$^2$, the density of Al—Fe compound particles on the surfaces of the unplated aluminum alloy substrate does not sufficiently increase in some cases. In contrast, at a grinding pressure applied to the disk blank exceeding 500 g/cm$^2$, the disk blank has uneven surfaces because of deep processing traces, which may cause plating deficiencies. In the grinding step (S17), the surfaces of the disk blank are ground at the amount corresponding to a thickness of 1 μm or more per one surface. That is, the grinding of the disk blank at the amount of 1 μm or more per one surface in the grinding step (S17) can sufficiently increase the density of Al—Fe compound particles on the surface of the unplated aluminum alloy substrate. The upper limit of the amount of grinding is not particularly limited.

(Stress-Relieving Heat Treatment Step (S18))

In the stress-relieving heat treatment step (S18) subsequent to the grinding step (S17), the disk blank ground in the grinding step (S17) is heated to remove stress from the disk blank. This process yields the unplated aluminum alloy substrate. Exemplary conditions of heating of the disk blank include a temperature of 250° C. to 400° C. and a period of 5 to 15 minutes.

(Alkaline Degreasing Step (S21))

In the alkaline degreasing step (S21), the surfaces of the unplated aluminum alloy substrate are decreased. Exemplary degreasing conditions include a decreasing solution of commercially available AD-68F (manufactured by C. Uyemura & Co., Ltd.), a concentration of the degreasing solution of 200 to 800 mL/L, a treatment period (period of immersion of the unplated aluminum alloy substrate in the degreasing solution) of three to ten minutes, and a temperature of the degreasing solution of 40° C. to 70° C.

(Acid Etching Step (S22))

In the acid etching step (S22) subsequent to the alkaline degreasing step (S21), the surfaces of the aluminum alloy substrate degreased in the alkaline degreasing step (S21) are subject to acid etching. Exemplary acid etching conditions include an etchant of commercially available AD-107F (manufactured by C. Uyemura & Co., Ltd.), a concentration of the etchant of 20 to 100 mL/L, a treatment period (period of immersion of the aluminum alloy substrate in the etchant) of 0.5 to 5 minutes, and a temperature of the etchant of 50° C. to 75° C.

(Desmutting Step (S23))

In the desmutting step (S23) subsequent to the acid etching step (S22), the aluminum alloy substrate etched in the acid etching step (S22) is subject to desmutting to remove smut from the surfaces of the aluminum alloy substrate. Exemplary desmutting conditions include a desmutting solution of $HNO_3$, a concentration of the desmutting solution of 10% to 60%, a treatment period (period of immersion of the aluminum alloy substrate in the desmutting solution) of 10 to 120 seconds, and a temperature of the desmutting solution of 15° C. to 40° C.

(Zincate Treatment Step (S24))

In the zincate treatment step (S24) subsequent to the desmutting step (S23), the aluminum alloy substrate after removal of smut in the desmutting step (S23) receives zincate treatments to form zincate coatings on the surfaces of the aluminum alloy substrate. The zincate coatings contain Zn. This process yields an aluminum alloy substrate for a magnetic disk. The zincate treatment step (S24) involves two zincate treatments including a first zincate treatment and a second zincate treatment in order to ensure adhesion between the aluminum alloy substrate and the base plating layers.

The first zincate treatment is conducted, for example, using a zincate solution of commercially available AD-301F-3X (manufactured by C. Uyemura & Co., Ltd.), at a concentration of the zincate solution of 100 to 500 mL/L, for a treatment period (period of immersion of the aluminum alloy substrate in the zincate solution) of 0.1 to 5 minutes, at a temperature of the zincate solution of 10° C. to 35° C. After the first zincate treatment, the surfaces of the aluminum alloy substrate are subject to Zn peeling using a peeling solution of $HNO_3$, at a concentration of the peeling solution of 10% to 60%, for a treatment period (period of immersion of the aluminum alloy substrate in the peeling solution) of 10 to 120 seconds, at a temperature of 15° C. to 40° C. The aluminum alloy substrate after the Zn peeling then receives the second zincate treatment under basically the same conditions as the first zincate treatment. This process provides zincate coatings containing Zn on the surface of the aluminum alloy substrate.

In the process (S30) subsequent to the zincate treatment step (S24), the aluminum alloy substrate provided with the zincate coatings in the zincate treatment step (S24) is subject to electroless Ni—P plating to form base plating layers (electroless Ni—P plating layers) on the surfaces of the aluminum alloy substrate via the zincate coatings. This process yields a magnetic disk substrate for a magnetic disk. Exemplary conditions of electroless Ni—P plating include a plating solution of commercially available NIMUDEN HDX (manufactured by C. Uyemura & Co., Ltd.), an Ni concentration in the plating solution of 3 to 10 g/L, a treatment period (period of immersion of the aluminum alloy substrate in the plating solution) of 30 to 180 minutes, and a temperature of the plating solution of 80° C. to 95° C.

The above-mentioned solutions are mere examples and may be replaced with other solutions that can contribute to fabrication of a magnetic disk substrate having desired characteristics.

5. Magnetic Disk and a Method of Fabricating the Magnetic Disk

A magnetic disk is composed of the magnetic disk substrate, and a magnetic layer provided on the base plating layer directly or holding an interlayer therebetween. The magnetic disk may further include additional layers, such as a foundation layer, protective layer, and lubricating layer, in addition to the magnetic layer. These additional layers contain known substances.

A method of fabricating the magnetic disk involves a spattering step. In the spattering step, the magnetic disk substrate is provided with a magnetic layer by sputtering a material constituting the magnetic layer onto the substrate. This process yields a magnetic disk. The surface of the base plating layer may be smoothed by polishing, for example, before the spattering.

EXAMPLES

Examples of the disclosure will now be described in more detail but should not be construed as limiting the disclosure.

In the casting step, materials were melted to prepare a molten aluminum alloy having each of the compositions shown in Table 1. This molten aluminum alloy was casted by the DC casting method to produce an aluminum alloy ingot.

The resulting ingot was subject to facing on both surfaces at a thickness of 15 mm and then homogenized at 520° C. for one hour. The ingot was then hot rolled at an initial temperature of 460° C. and a final temperature of 280° C. to produce a hot rolled plate having a thickness of 3.0 mm.

The hot rolled plate was then cold rolled (at a reduction ratio of 73.3%) to produce an aluminum alloy plate having a thickness of 0.8 mm. In the punching step, the aluminum alloy plate was punched to yield an annular disk blank having an outer diameter of 96 mm and an inner diameter of 24 mm.

The disk blank was then subject to pressure annealing and flattening under a pressure of 1.5 MPa at 270° C. for three hours to flatten the surfaces of the disk blank. The end faces of the flattened disk blank were cut such that the disk blank had an outer diameter of 95 mm and an inner diameter of 25 mm. The resulting disk blank then underwent one or more of cutting, preliminary grinding, and grinding under each of the conditions shown in Table 2. The disk blank then received a stress relieving heat treatment at 270° C. for ten minutes. This process yielded an unplated aluminum alloy substrate.

This unplated aluminum alloy substrate was then subject to alkaline degreasing at 60° C. for five minutes using the degreasing solution AD-68F (manufactured by C. Uyemura & Co., Ltd.). The aluminum alloy substrate after the alkaline degreasing was subject to acid etching at 65° C. for three minutes using the etchant AD-107F (manufactured by C. Uyemura & Co., Ltd.), and was then desmutted at a room temperature for 50 seconds using a 30% $HNO_3$ aqueous solution. The desmutted aluminum alloy substrate received a first zincate treatment at 25° C. for 50 seconds using the zincate solution AD-301F-3X (manufactured by C. Uyemura & Co., Ltd.), Zn peeling at a room temperature for 60 seconds using a 30% $HNO_3$ aqueous solution, and then a second zincate treatment at 25° C. for 60 seconds using the zincate solution AD-301F-3X (manufactured by C. Uyemura & Co., Ltd.).

The aluminum alloy substrate after the second zincate treatment was then provided with electroless Ni—P plating layers having a thickness of 17 μm by electroless Ni—P plating at 90° C. for 150 minutes using the electroless Ni—P plating solution NIMUDEN HDX (manufactured by C. Uyemura & Co., Ltd.). This process was followed by polish finishing (at an amount of 4 μm per one surface) of the surfaces of the electroless Ni—P plating layers with a fabric, and thus completed a magnetic disk substrate.

The unplated aluminum alloy substrate and the magnetic disk substrate fabricated as explained above underwent the evaluations below:

(Evaluation 1: Glow Discharge Optical Emission Spectroscopy for Magnetic Disk Substrates)

Using a glow discharge optical emission spectroscopy device JY5000RF (manufactured by HORIBA, Ltd.) set at a gas pressure of 400 Pa and an output of 30 W, Fe emission intensities and Al emission intensities of each of the magnetic disk substrates were measured in a sputter time of 300 seconds in the depthwise direction from the surface of the magnetic disk substrate. Based on the measured values, the average Al emission intensity was calculated in a sputter time of 250 to 300 seconds, and then the maximum Fe emission intensity (peak value) $(I(1)_{Fe(max)})$ was acquired from the range of sputter time that provides emission intensities equal to 50% to 84% of the average emission intensity. The average Fe emission intensity $(I(1)_{Fe(ave)})$ in the interior region of the aluminum alloy substrate was calculated by averaging the Fe emission intensities in a sputter time of 250 to 300 seconds. Then, the desired value was calculated by dividing the maximum Fe emission intensity $(I(1)_{Fe(max)})$ by the average Fe emission intensity $(I(1)_{Fe(ave)})$. The results are shown in Table 3.

(Evaluation 2: Glow Discharge Optical Emission Spectroscopy for Unplated Aluminum Alloy Substrates)

Using the glow discharge optical emission spectroscopy device JY5000RF (manufactured by HORIBA, Ltd.) set at a gas pressure of 400 Pa and an output of 30 W, Fe emission intensities and Al emission intensities of each of the unplated aluminum alloy substrates were measured in a sputter time of 20 seconds in the depthwise direction from the surface of the unplated aluminum alloy substrate. Based on the measured values, the average Al emission intensity was calculated in a sputter time of 15 to 20 seconds, and then the maximum Fe emission intensity (peak value) $(I(2)_{Fe(max)})$ was acquired from the range of sputter time that provides emission intensities equal to 50% to 84% of the average emission intensity. The average Fe emission intensity $(I(2)_{Fe(ave)})$ the interior region of the unplated aluminum alloy substrate was calculated by averaging the Fe emission intensities in a sputter time of 15 to 20 seconds. Then, the desired value was calculated by dividing the maximum Fe emission intensity $(I(2)_{Fe(max)})$ by the average Fe emission intensity $(I(2)_{Fe(ave)})$. The results are shown in Table 3.

(Evaluation 3: Plating Smoothness)

Each of the fabricated magnetic disk substrates was immersed in a 50-vol % $HNO_3$ at 50° C. for three minutes to etch the surface of the electroless Ni—P plating layer. The etched surface of the electroless Ni—P plating layer was imaged with a SEM of five fields at a magnification of 5,000×. Each field has an area of 536 μm$^2$. The number of deficiencies on the electroless Ni—P plating layer was counted in the taken images of five fields, to calculate the arithmetic average in the five fields. An arithmetic average value of less than five per field was evaluated as A, a value of five or more and less than ten per field was evaluated as B, and a value of ten or more per field was evaluated as C. The results are shown in Table 3.

(Evaluation 4: Fluttering Characteristics)

Each of the fabricated magnetic disk substrates was installed in a commercially available hard disk drive in the presence of air and evaluated. The used hard disk drive was ST2000 (commercial name, manufactured by Seagate Technology LLC). The motor was directly coupled to and driven by the driver SLD102 (commercial name, manufactured by Tekunoaraibu kabushikigaisha). The rotational speed of magnetic disk substrates was set to 7200 rpm. A plurality of magnetic disk substrates was installed all the time, and the upper one of the substrates was provided with the laser Doppler vibrometer LDV1800 (commercial name, manufactured by Ono Sokki Co., Ltd.) on the surface of the substrate to observe vibration of the surface. The observed vibration was subject to spectrum analysis using the FFT analyzer DS3200 (commercial name, manufactured by Ono Sokki Co., Ltd.). The surface of the magnetic disk substrate was observed through an opening preliminarily formed in the cover of the hard disk drive. The squeeze plate of the commercially available hard disk drive was preliminarily removed for evaluation. The level of fluttering characteristics was evaluated based on the maximum displacement (level of disk flutter (nm)) of a broad peak near the range of 300 to 1500 Hz in which flutters emerge. This broad peak is called non-repeatable run out (NRRO) and has been found to significantly affect the occurrence of errors in positioning of a magnetic head. A level of fluttering characteristics of 30 nm or less in the air was evaluated as A, a level of more than 30 nm and equal to or less than 50 nm as B, and a level of more than 50 nm as C. The results are shown in Table 3.

FIG. 1 is a graph illustrating a relationship between emission intensity and sputter time determined by glow discharge optical emission spectroscopy for a magnetic disk substrate according to Example 1 in the depthwise direction from the surface. The glow discharge optical emission spectroscopy for the magnetic disk substrate was conducted from the surface of the electroless Ni—P plating layer to the aluminum alloy substrate in the depthwise direction of the magnetic disk substrate. The y-axis represents the emission intensity of an element and the x-axis represents a sputter time.

As illustrated in FIG. 1, the Fe emission intensity was found to have a peak value within the range of sputter time in which the Al emission intensities are equal to 50% to 84% of the average Al emission intensity in the interior region of the aluminum alloy substrate. This peak value $(I(1)_{Fe(max)})$ was higher than the average Fe emission intensity $(I(1)_{Fe(ave)})$ in the interior region of the aluminum alloy substrate. This situation means that Al—Fe compound particles were concentrated in the specific boundary region $(D(1)_{I(50-84)})$ formed at the interface between the electroless Ni—P plating layer and the aluminum alloy substrate, so that the specific boundary region $(D(1)_{I(50-84)})$ had an Fe density higher than the Fe density in the interior region of the aluminum alloy substrate, that is, the specific boundary region $(D(1)_{I(50-84)})$ had a density of Al—Fe compound particles higher than the density of Al—Fe compound particles in the interior region of the aluminum alloy substrate.

Figure 2:
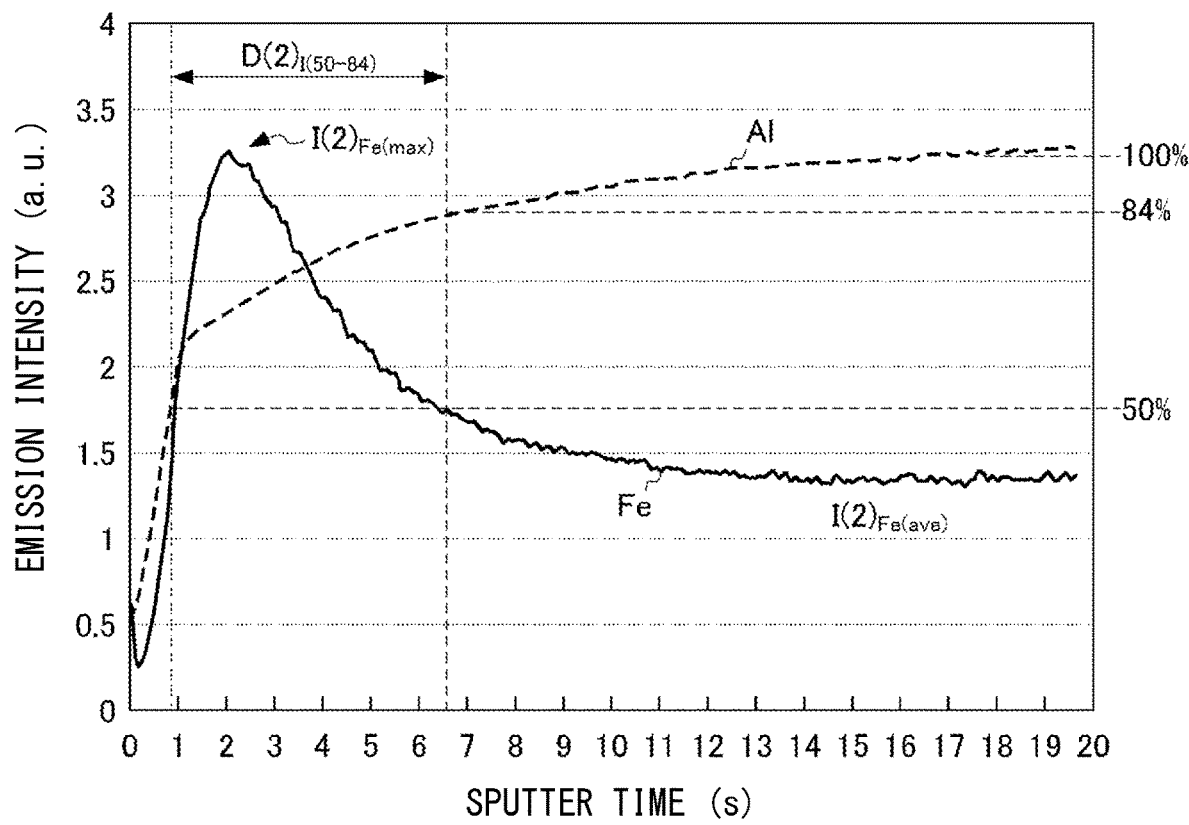
FIG. 2 is a graph illustrating a relationship between emission intensity and sputter time determined by glow discharge optical emission spectroscopy for an unplated aluminum alloy substrate to be applied to a magnetic disk substrate according to Example 1 in the depthwise direction from the surface.

FIG. 2 is a graph illustrating a relationship between emission intensity and sputter time determined by glow discharge optical emission spectroscopy for an unplated aluminum alloy substrate to be applied to the magnetic disk substrate according to Example 1 in the depthwise direction from the surface. The glow discharge optical emission spectroscopy for the unplated aluminum alloy substrate was conducted from the surface of the unplated aluminum alloy substrate to the interior region in the depthwise direction of the unplated aluminum alloy substrate. The y-axis represents the emission intensity of an element and the x-axis represents a sputter time.

As illustrated in FIG. 2, the Fe emission intensity was found to have a peak value within the range of sputter time in which the Al emission intensities are equal to 50% to 84% of the average Al emission intensity in the interior region of the unplated aluminum alloy substrate. This peak value $(I(2)_{Fe(max)})$ was higher than the average Fe emission intensity $I(2)_{Fe(ave)})$ in the interior region of the unplated aluminum alloy substrate. This situation means that Al—Fe compound particles were concentrated in the specific surface region $(D(2)_{(I(50-84)})$ formed in the surface of the unplated aluminum alloy substrate, so that the specific surface region $(D(2)_{I(50-84)})$ had an Fe density higher than the Fe density in the interior region of the unplated aluminum alloy substrate, that is, the specific surface region $(D(2)_{I(50-84)})$ had a density of Al—Fe compound particles higher than the density of Al—Fe compound particles in the interior region of the unplated aluminum alloy substrate.

Examples 1 to 30 and 61 to 73 and Comparative Examples 1 to 6 had mutually different aluminum alloy compositions. Examples 31 to 60 and Comparative Examples 20 to 23 had mutually different processing conditions on the surfaces of a disk blank.

Each of Examples 1 to 60 was evaluated to be good in terms of plating smoothness and fluttering characteristics because of the Fe emission intensity and the composition of the aluminum alloy substrate that fall within the predetermined ranges.

Example 61 provided insufficient fluttering characteristics resulting from few second phase particles due to the low Fe content.

Example 62 provided insufficient plating smoothness because a number of coarse Al—Fe compound particles generated due to the high Fe content fell off and yielded large pits that caused deficiencies on the electroless Ni—P plating layer.

Example 63 provided insufficient fluttering characteristics resulting from few second phase particles due to the low Mn content.

Example 64 provided insufficient plating smoothness because a number of coarse Al—Mn compound particles generated due to the high Mn content fell off and yielded large pits that caused deficiencies on the electroless Ni—P plating layer.

Comparative Example 1 provided insufficient fluttering characteristics resulting from few second phase particles due to the low Cu content. In addition, Comparative Example 1 provided insufficient plating smoothness because the provided zincate coating was nonuniform and caused deficiencies on the surface of the electroless Ni—P plating layer.

Comparative Example 2 provided insufficient plating smoothness because a number of coarse Al—Cu compound particles generated due to the high Cu content fell off and yielded large pits that caused deficiencies on the electroless Ni—P plating layer.

Comparative Example 3 provided insufficient fluttering characteristics resulting from few second phase particles due to the low Zn content. In addition, Comparative Example 3 provided insufficient plating smoothness because the provided zincate coating was nonuniform and caused deficiencies on the surface of the electroless Ni—P plating layer.

Comparative Example 4 provided insufficient plating smoothness because the electric potential of the matrix was excessively less noble due to the high Zn content and made the zincate coating nonuniform, thereby causing deficiencies on the surface of the electroless Ni—P plating layer.

Example 65 provided insufficient plating smoothness because a number of coarse Si particles generated due to the high Si content fell off and yielded large pits that caused deficiencies on the electroless Ni—P plating layer.

Example 66 provided insufficient plating smoothness because a number of coarse Al—Ni compound particles generated due to the high Ni content fell off and yielded large pits that caused deficiencies on the electroless Ni—P plating layer.

Comparative Example 5 failed to fabricate a magnetic disk substrate because the high Mg content inhibited the rolling.

Example 67 provided insufficient plating smoothness because a number of coarse Al—Cr compound particles generated due to the high Cr content fell off and yielded large pits that caused deficiencies on the electroless Ni—P plating layer.

Example 68 provided insufficient plating smoothness because a number of coarse Al—Zr compound particles generated due to the high Zr content fell off and yielded large pits that caused deficiencies on the electroless Ni—P plating layer.

Example 69 provided insufficient plating smoothness because a number of coarse Al—Fe compound particles generated due to the high Fe content fell off and yielded large pits that caused deficiencies on the electroless Ni—P plating layer.

Example 70 provided insufficient plating smoothness because a number of coarse Al—Fe compound particles and coarse Al—Cu compound particles generated due to the high Fe and Cu contents fell off and yielded large pits that caused deficiencies on the electroless Ni—P plating layer.

Comparative Example 6 failed to fabricate a magnetic disk substrate because the high Mg content (as well as the high Si, Ni, Cr, and Zr contents) inhibited the rolling.

Example 71 provided insufficient plating smoothness because a number of coarse Si particles and coarse Al—Cr compound particles generated due to the high Si and Cr contents fell off and yielded large pits that caused deficiencies on the electroless Ni—P plating layer.

Example 72 provided insufficient plating smoothness because a number of coarse Al—Mn compound particles generated due to the high Mn content fell off and yielded large pits that caused deficiencies on the electroless Ni—P plating layer.

Example 73 provided insufficient plating smoothness because a number of coarse Al—Fe compound particles, coarse Al—Mn compound particles, and coarse Al—Cu compound particles generated due to the high Fe, Mn, and Cu contents fell off and yielded large pits that caused deficiencies on the electroless Ni—P plating layer. The plating smoothness was impaired also because the electric potential of the matrix was excessively less noble due to the high Zn content and made the zincate coating nonuniform, thereby causing deficiencies on the surface of the electroless Ni—P plating layer.

Comparative Example 20 provided insufficient plating smoothness because no surface treatment was conducted so that Al—Fe compound particles were not concentrated on the surface of the unplated aluminum alloy substrate, thereby causing deficiencies on the electroless Ni—P plating layer.

Comparative Example 21 provided insufficient plating smoothness because the density of Al—Fe compound particles concentrated on the surface of the unplated aluminum alloy substrate was not sufficiently increased due to the low applied pressure in the grinding step, thereby causing deficiencies on the electroless Ni—P plating layer.

Each of Comparative Examples 22 and 23 provided insufficient plating smoothness because the density of Al—Fe compound particles concentrated on the surface of the unplated aluminum alloy substrate was not sufficiently increased due to the small thickness reduction in the grinding step, thereby causing deficiencies on the electroless Ni—P plating layer.

TABLE 1

| Alloy No. | CONSTITUENT ELEMENTS (mass %) | | | | | | | | | | | | | Al + UNAVOIDABLE IMPURITIES |
|---|---|---|---|---|---|---|---|---|---|---|---|---|---|---|
| | Fe | Mn | Cu | Zn | Si | Ni | Mg | Cr | Zr | Ti | B | V | Ti + B + V | |
| A1 | 1.8 | 0.7 | 0.020 | 0.500 | 0.2 | — | — | — | — | — | — | — | — | Bal. |
| A2 | 0.4 | 0.7 | 0.020 | 0.500 | — | — | — | — | — | — | — | — | — | Bal. |
| A3 | 3.0 | 0.7 | 0.020 | 0.500 | — | — | — | — | — | — | — | — | — | Bal. |
| A4 | 1.8 | 0.1 | 0.020 | 0.500 | — | — | — | — | — | — | — | — | — | Bal. |
| A5 | 1.8 | 3.0 | 0.020 | 0.500 | — | — | — | — | — | — | — | — | — | Bal. |
| A6 | 1.8 | 0.7 | 0.005 | 0.500 | — | — | — | — | — | — | — | — | — | Bal. |
| A7 | 1.8 | 0.7 | 1.000 | 0.500 | — | — | — | — | — | — | — | — | — | Bal. |
| A8 | 1.8 | 0.7 | 0.020 | 0.005 | — | — | — | — | — | — | — | — | — | Bal. |
| A9 | 1.8 | 0.7 | 0.020 | 1.000 | — | — | — | — | — | — | — | — | — | Bal. |
| A10 | 1.8 | 0.7 | 0.020 | 0.500 | 0.1 | — | — | — | — | — | — | — | — | Bal. |
| A11 | 1.8 | 0.7 | 0.020 | 0.500 | 0.4 | — | — | — | — | — | — | — | — | Bal. |
| A12 | 1.8 | 0.7 | 0.020 | 0.500 | — | 0.1 | — | — | — | — | — | — | — | Bal. |
| A13 | 1.8 | 0.7 | 0.020 | 0.500 | — | 3.0 | — | — | — | — | — | — | — | Bal. |
| A14 | 1.8 | 0.7 | 0.020 | 0.500 | — | — | 0.1 | — | — | — | — | — | — | Bal. |
| A15 | 1.8 | 0.7 | 0.020 | 0.500 | — | — | 6.0 | — | — | — | — | — | — | Bal. |
| A16 | 1.8 | 0.7 | 0.020 | 0.500 | — | — | — | 0.01 | — | — | — | — | — | Bal. |
| A17 | 1.8 | 0.7 | 0.020 | 0.500 | — | — | — | 1.00 | — | — | — | — | — | Bal. |
| A18 | 1.8 | 0.7 | 0.020 | 0.500 | — | — | — | — | 0.01 | — | — | — | — | Bal. |
| A19 | 1.8 | 0.7 | 0.020 | 0.500 | — | — | — | — | 1.00 | — | — | — | — | Bal. |
| A20 | 1.8 | 0.7 | 0.020 | 0.500 | — | — | — | — | — | 0.002 | 0.002 | 0.001 | 0.005 | Bal. |
| A21 | 1.8 | 0.7 | 0.020 | 0.500 | — | — | — | — | — | 0.200 | 0.200 | 0.100 | 0.500 | Bal. |
| A22 | 1.8 | 0.7 | 0.020 | 0.500 | 0.3 | — | 2.0 | — | — | — | — | — | — | Bal. |
| A23 | 1.8 | 0.7 | 0.020 | 0.500 | — | 1.0 | — | — | 0.10 | — | — | — | — | Bal. |
| A24 | 1.8 | 0.7 | 0.020 | 0.500 | 0.3 | — | — | 0.10 | — | 0.020 | 0.020 | 0.010 | 0.050 | Bal. |
| A25 | 1.8 | 0.7 | 0.020 | 0.500 | — | 1.2 | 0.5 | — | — | — | — | — | — | Bal. |
| A26 | 1.8 | 0.7 | 0.020 | 0.500 | 0.2 | — | — | 0.10 | 0.20 | — | — | — | — | Bal. |
| A27 | 1.8 | 0.7 | 0.020 | 0.500 | 0.2 | 0.3 | 1.0 | 0.20 | 0.20 | — | — | — | — | Bal. |
| A28 | 1.8 | 0.7 | 0.020 | 0.500 | 0.2 | 0.3 | 1.0 | 0.20 | 0.20 | 0.003 | 0.003 | 0.003 | 0.009 | Bal. |
| A29 | 1.3 | 1.0 | 0.500 | 0.800 | — | — | — | — | — | — | — | — | — | Bal. |
| A30 | 2.2 | 2.5 | 0.700 | 0.700 | — | — | — | — | — | — | — | — | — | Bal. |
| B1 | 0.2 | 0.7 | 0.020 | 0.500 | — | — | — | — | — | — | — | — | — | Bal. |
| B2 | 3.5 | 0.7 | 0.020 | 0.500 | — | — | — | — | — | — | — | — | — | Bal. |
| B3 | 1.8 | 0.07 | 0.020 | 0.500 | — | — | — | — | — | — | — | — | — | Bal. |
| B4 | 1.8 | 3.5 | 0.020 | 0.500 | — | — | — | — | — | — | — | — | — | Bal. |
| B5 | 1.8 | 0.7 | 0.002 | 0.500 | — | — | — | — | — | — | — | — | — | Bal. |
| B6 | 1.8 | 0.7 | 1.500 | 0.500 | — | — | — | — | — | — | — | — | — | Bal. |
| B7 | 1.8 | 0.7 | 0.020 | 0.002 | — | — | — | — | — | — | — | — | — | Bal. |
| B8 | 1.8 | 0.7 | 0.020 | 1.500 | — | — | — | — | — | — | — | — | — | Bal. |
| B9 | 1.8 | 0.7 | 0.020 | 0.500 | 0.7 | — | — | — | — | — | — | — | — | Bal. |
| B10 | 1.8 | 0.7 | 0.020 | 0.500 | — | 3.5 | — | — | — | — | — | — | — | Bal. |
| B11 | 1.8 | 0.7 | 0.020 | 0.500 | — | — | 6.2 | — | — | — | — | — | — | Bal. |
| B12 | 1.8 | 0.7 | 0.020 | 0.500 | — | — | — | 1.50 | — | — | — | — | — | Bal. |
| B13 | 1.8 | 0.7 | 0.020 | 0.500 | — | — | — | — | 1.50 | — | — | — | — | Bal. |
| B14 | 3.3 | 0.7 | 0.020 | 0.500 | 0.3 | — | 0.3 | — | — | — | — | — | — | Bal. |
| B15 | 3.3 | 0.7 | 1.500 | 0.500 | 0.2 | 0.3 | 1.0 | 0.20 | 0.20 | 0.003 | 0.003 | 0.003 | 0.009 | Bal. |
| B16 | 1.8 | 0.7 | 0.020 | 0.500 | 0.8 | 3.5 | 6.2 | 1.50 | 1.50 | — | — | — | — | Bal. |
| B17 | 1.8 | 0.7 | 0.020 | 0.500 | 0.8 | — | — | 1.50 | — | — | — | — | — | Bal. |
| B18 | 1.8 | 4.0 | 0.020 | 0.500 | 0.2 | 0.3 | — | — | 0.20 | — | — | — | — | Bal. |
| B19 | 3.3 | 3.5 | 1.500 | 1.500 | — | — | — | — | — | — | — | — | — | Bal. |

TABLE 2

| PROCESS No. | CUTTING STEP PROCESSED THICKNESS PER ONE SURFACE (μm) | PRELIMINARY GRINDING STEP PROCESSED THICKNESS PER ONE SURFACE (μm) | GRINDING STEP APPLIED PRESSURE (g/cm²) | GRINDING STEP PROCESSED THICKNESS PER ONE SURFACE (μm) |
|---|---|---|---|---|
| C1  | — | — | 30  | 1 |
| C2  | — | — | 30  | 5 |
| C3  | — | — | 30  | 10 |
| C4  | — | — | 50  | 1 |
| C5  | — | — | 50  | 5 |
| C6  | — | — | 50  | 10 |
| C7  | — | — | 100 | 1 |
| C8  | — | — | 100 | 5 |
| C9  | — | — | 100 | 10 |
| C10 | — | — | 200 | 1 |
| C11 | — | — | 200 | 5 |
| C12 | — | — | 200 | 10 |
| C13 | — | — | 300 | 1 |
| C14 | — | — | 300 | 5 |
| C15 | — | — | 300 | 10 |
| C16 | 5  | — | 50 | 5 |
| C17 | 10 | — | 50 | 5 |
| C18 | 20 | — | 50 | 5 |
| C19 | — | 1  | 50 | 5 |
| C20 | — | 5  | 50 | 5 |
| C21 | — | 10 | 50 | 5 |
| C22 | 5  | — | 100 | 5 |
| C23 | 10 | — | 100 | 5 |
| C24 | 20 | — | 100 | 5 |
| C25 | — | 1  | 100 | 5 |
| C26 | — | 5  | 100 | 5 |
| C27 | — | 10 | 100 | 5 |
| C28 | 5  | 5  | 50 | 5 |
| C29 | 5  | 10 | 50 | 5 |
| C30 | 20 | 10 | 50 | 5 |
| C31 | — | — | 30 | 100 |
| D1  | — | — | —  | — |
| D2  | — | — | 10 | 0.2 |
| D3  | — | — | 30 | 0.2 |
| D4  | — | −50 | 0.2 | D4 |

TABLE 3

| | ALLOY No. | PROCESS No. | MAGNETIC DISK SUBSTRATE | UNPLATED ALUMINUM ALLOY SUBSTRATE | PLATING SMOOTHNESS | FLUTTERING CHARACTERISTICS |
|---|---|---|---|---|---|---|
| EXAMPLE 1  | A1  | C3 | 1.034 | 1.18 | A | A |
| EXAMPLE 2  | A2  | C3 | 1.097 | 1.28 | B | B |
| EXAMPLE 3  | A3  | C3 | 1.079 | 1.11 | B | A |
| EXAMPLE 4  | A4  | C3 | 1.077 | 1.31 | A | B |
| EXAMPLE 5  | A5  | C3 | 1.018 | 1.37 | B | A |
| EXAMPLE 6  | A6  | C3 | 1.017 | 1.23 | B | B |
| EXAMPLE 7  | A7  | C3 | 1.091 | 1.16 | B | A |
| EXAMPLE 8  | A8  | C3 | 1.016 | 1.38 | B | B |
| EXAMPLE 9  | A9  | C3 | 1.081 | 1.11 | B | A |
| EXAMPLE 10 | A10 | C3 | 1.059 | 1.32 | A | A |
| EXAMPLE 11 | A11 | C3 | 1.086 | 1.35 | B | A |
| EXAMPLE 12 | A12 | C3 | 1.047 | 1.16 | A | A |
| EXAMPLE 13 | A13 | C3 | 1.083 | 1.21 | B | A |
| EXAMPLE 14 | A14 | C3 | 1.042 | 1.12 | A | A |
| EXAMPLE 15 | A15 | C3 | 1.026 | 1.38 | A | A |
| EXAMPLE 16 | A16 | C3 | 1.066 | 1.21 | A | A |
| EXAMPLE 17 | A17 | C3 | 1.077 | 1.22 | A | A |
| EXAMPLE 18 | A18 | C3 | 1.035 | 1.13 | A | A |
| EXAMPLE 19 | A19 | C3 | 1.076 | 1.17 | A | A |
| EXAMPLE 20 | A20 | C3 | 1.084 | 1.29 | A | A |
| EXAMPLE 21 | A21 | C3 | 1.037 | 1.26 | B | A |
| EXAMPLE 22 | A22 | C3 | 1.096 | 1.14 | B | A |
| EXAMPLE 23 | A23 | C3 | 1.084 | 1.14 | A | A |
| EXAMPLE 24 | A24 | C3 | 1.097 | 1.27 | B | A |
| EXAMPLE 25 | A25 | C3 | 1.039 | 1.33 | A | A |
| EXAMPLE 26 | A26 | C3 | 1.052 | 1.11 | B | A |
| EXAMPLE 27 | A27 | C3 | 1.014 | 1.27 | B | A |
| EXAMPLE 28 | A28 | C3 | 1.021 | 1.38 | B | A |
| EXAMPLE 29 | A29 | C3 | 1.012 | 1.31 | A | A |
| EXAMPLE 30 | A30 | C3 | 1.011 | 1.34 | A | A |
| EXAMPLE 61 | B1  | C3 | 1.013 | 1.21 | A | C |
| EXAMPLE 62 | B2  | C3 | 1.163 | 1.38 | C | A |
| EXAMPLE 63 | B3  | C3 | 1.048 | 1.13 | A | C |
| EXAMPLE 64 | B4  | C3 | 1.084 | 1.28 | C | A |
| COMPARATIVE EXAMPLE 1 | B5 | C3 | 0.943 | 1.18 | C | C |
| COMPARATIVE EXAMPLE 2 | B6 | C3 | 0.967 | 1.14 | C | A |
| COMPARATIVE EXAMPLE 3 | B7 | C3 | 0.874 | 1.18 | C | C |
| COMPARATIVE EXAMPLE 4 | B8 | C3 | 0.969 | 1.10 | C | A |
| EXAMPLE 65 | B9  | C3 | 1.095 | 1.38 | C | A |
| EXAMPLE 66 | B10 | C3 | 1.099 | 1.19 | C | A |

TABLE 3-continued

| | ALLOY No. | PROCESS No. | MAGNETIC DISK SUBSTRATE | UNPLATED ALUMINUM ALLOY SUBSTRATE | PLATING SMOOTHNESS | FLUTTERING CHARACTERISTICS |
|---|---|---|---|---|---|---|
| COMPARATIVE EXAMPLE 5 | B11 | C3 | — | — | — | — |
| EXAMPLE 67 | B12 | C3 | 1.037 | 1.12 | C | A |
| EXAMPLE 68 | B13 | C3 | 1.059 | 1.34 | C | A |
| EXAMPLE 69 | B14 | C3 | 1.048 | 1.17 | C | A |
| EXAMPLE 70 | B15 | C3 | 1.081 | 1.24 | C | A |
| COMPARATIVE EXAMPLE 6 | B16 | C3 | — | — | — | — |
| EXAMPLE 71 | B17 | C3 | 1.064 | 1.30 | C | A |
| EXAMPLE 72 | B18 | C3 | 1.051 | 1.14 | C | A |
| EXAMPLE 73 | B19 | C3 | 1.036 | 1.30 | C | A |
| EXAMPLE 31 | A1 | C1 | 1.087 | 1.10 | B | A |
| EXAMPLE 32 | A1 | C2 | 1.044 | 1.14 | A | A |
| EXAMPLE 33 | A1 | C4 | 1.037 | 1.17 | B | A |
| EXAMPLE 34 | A1 | C5 | 1.011 | 1.23 | A | A |
| EXAMPLE 35 | A1 | C6 | 1.023 | 1.22 | A | A |
| EXAMPLE 36 | A1 | C7 | 1.096 | 1.22 | B | A |
| EXAMPLE 37 | A1 | C8 | 1.037 | 1.25 | A | A |
| EXAMPLE 38 | A1 | C9 | 1.024 | 1.31 | A | A |
| EXAMPLE 39 | A1 | C10 | 1.036 | 1.22 | B | A |
| EXAMPLE 40 | A1 | C11 | 1.065 | 1.40 | A | A |
| EXAMPLE 41 | A1 | C12 | 1.080 | 1.36 | A | A |
| EXAMPLE 42 | A1 | C13 | 1.021 | 1.27 | B | A |
| EXAMPLE 43 | A1 | C14 | 1.091 | 1.33 | A | A |
| EXAMPLE 44 | A1 | C15 | 1.081 | 1.37 | A | A |
| EXAMPLE 45 | A1 | C16 | 1.064 | 1.22 | A | A |
| EXAMPLE 46 | A1 | C17 | 1.034 | 1.27 | A | A |
| EXAMPLE 47 | A1 | C18 | 1.082 | 1.18 | A | A |
| EXAMPLE 48 | A1 | C19 | 1.064 | 1.25 | A | A |
| EXAMPLE 49 | A1 | C20 | 1.021 | 1.13 | A | A |
| EXAMPLE 50 | A1 | C21 | 1.062 | 1.31 | A | A |
| EXAMPLE 51 | A1 | C22 | 1.017 | 1.36 | A | A |
| EXAMPLE 52 | A1 | C23 | 1.040 | 1.34 | A | A |
| EXAMPLE 53 | A1 | C24 | 1.019 | 1.30 | A | A |
| EXAMPLE 54 | A1 | C25 | 1.046 | 1.39 | A | A |
| EXAMPLE 55 | A1 | C26 | 1.018 | 1.31 | A | A |
| EXAMPLE 56 | A1 | C27 | 1.062 | 1.34 | A | A |
| EXAMPLE 57 | A1 | C28 | 1.056 | 1.28 | A | A |
| EXAMPLE 58 | A1 | C29 | 1.059 | 1.21 | A | A |
| EXAMPLE 59 | A1 | C30 | 1.043 | 1.24 | A | A |
| EXAMPLE 60 | A1 | C31 | 1.174 | 2.31 | A | A |
| COMPARATIVE EXAMPLE 20 | A1 | D1 | 0.843 | 0.94 | C | A |
| COMPARATIVE EXAMPLE 21 | A1 | D2 | 0.811 | 1.00 | C | A |
| COMPARATIVE EXAMPLE 22 | A1 | D3 | 0.765 | 0.93 | C | A |
| COMPARATIVE EXAMPLE 23 | A1 | D4 | 0.692 | 1.02 | C | A |

INDUSTRIAL APPLICABILITY

The above-described embodiments can provide a magnetic disk substrate that can achieve improved fluttering characteristics and effectively reduced deficiencies on the surface of a base electroless plating layer. This configuration can reduce the thickness of a magnetic disk and thus increase the number of magnetic disks installable in an HDD and can enhance the capacity of each magnetic disk, leading to an increase in capacity of HDD.

The invention claimed is:

1. A magnetic disk substrate comprising:
    an aluminum alloy substrate;
    a base plating layer on a surface of the aluminum alloy substrate; and
    a boundary region between the aluminum alloy substrate and the base plating layer, the boundary region comprising a specific boundary region $(D(1)_{I(50-84)})$ having Al emission intensities equal to 50% to 84% of an average Al emission intensity in an interior region of the aluminum alloy substrate in glow discharge optical emission spectroscopy in a depthwise direction from a surface of the magnetic disk substrate, wherein
    the specific boundary region $(D(1)_{I(50-84)})$ has a maximum Fe emission intensity $(I(1)_{Fe(max)})$ higher than an average Fe emission intensity $(I(1)_{Fe(ave)})$ in the interior region of the aluminum alloy substrate in the glow discharge optical emission spectroscopy, and
    the aluminum alloy substrate comprises 0.1 to 0.4 mass % of Si, 0.4 to 3.0 mass % of Fe, 0.1 to 3.0 mass % of Mn, 0.005 to 1.000 mass % of Cu, and 0.005 to 1.000 mass % of Zn, with a balance of Al and unavoidable impurities.

2. The magnetic disk substrate according to claim 1, wherein the base plating layer is an electroless Ni—P plating layer.

3. The magnetic disk substrate according to claim 1, wherein
    the magnetic disk substrate is fabricated using an unplated aluminum alloy substrate comprising a specific surface region $(D(2)_{I(50-84))})$ having Al emission intensities equal to 50% to 84% of an average Al emission intensity in an interior region of the unplated aluminum alloy substrate in glow discharge optical emission spectroscopy in a depthwise direction from a surface of the unplated aluminum alloy substrate, and the specific surface region $(D(2)_{I(50-84))})$ has a maximum Fe emission intensity $(I(2)_{Fe(max)})$ equal to or higher than 1.1 times of an average Fe emission intensity $(I(2)_{Fe(ave)})$ in the interior region of the unplated aluminum alloy substrate in the glow discharge optical emission spectroscopy.

4. The magnetic disk substrate according to claim 1, wherein the aluminum alloy substrate further comprises at least one element selected from a group consisting of 0.1 to 3.0 mass % of Ni, 0.1 to 6.0 mass % of Mg, 0.01 to 1.00 mass % of Cr, and 0.01 to 1.00 mass % of Zr.

5. The magnetic disk substrate according to claim 1, wherein the aluminum alloy substrate further comprises at least one element selected from a group consisting of Ti, B, and V at a total amount of 0.005 to 0.500 mass %.

6. A magnetic disk comprising:
the magnetic disk substrate according to claim 1; and
a magnetic layer disposed on the base plating layer of the magnetic disk substrate directly or holding an interlayer therebetween.

7. A method of fabricating the magnetic disk substrate according to claim 1, the method comprising:
a process of fabricating an unplated aluminum alloy substrate to be applied to the magnetic disk substrate, the process comprising:
a punching step of punching an aluminum alloy plate to produce a disk blank having an annular shape;
a pressure annealing step of heating the disk blank in a pressurized state to flatten the disk blank; and
a grinding step of grinding both surfaces of the flattened disk blank at an amount corresponding to a thickness of 1 μm or more per one surface.

8. The method of fabricating the magnetic disk substrate according to claim 7, wherein the process of fabricating an unplated aluminum alloy substrate further comprises a cutting step of cutting both surfaces of the disk blank before the grinding step.

9. The method of fabricating the magnetic disk substrate according to claim 7, wherein the process of fabricating an unplated aluminum alloy substrate further comprises a preliminarily grinding step of preliminary grinding both surfaces of the disk blank at an amount corresponding to a thickness of 1 μm or more per one surface before the grinding step.

* * * * *